US011988354B2

(12) United States Patent
Lim et al.

(10) Patent No.: US 11,988,354 B2
(45) Date of Patent: May 21, 2024

(54) LAMP FOR VEHICLE

(71) Applicant: SL Corporation, Daegu (KR)

(72) Inventors: Gyo Sung Lim, Gyeongsan-si (KR); Jong Ung Moon, Gyeongsan-si (KR)

(73) Assignee: SL Corporation, Daegu (KR)

( * ) Notice: Subject to any disclaimer, the term of this patent is extended or adjusted under 35 U.S.C. 154(b) by 0 days.

(21) Appl. No.: 18/333,602

(22) Filed: Jun. 13, 2023

(65) Prior Publication Data

US 2024/0003514 A1 Jan. 4, 2024

(30) Foreign Application Priority Data

Jun. 29, 2022 (KR) .................. 10-2022-0079353

(51) Int. Cl.
| | |
|---|---|
| *F21S 43/20* | (2018.01) |
| *F21S 43/14* | (2018.01) |
| *F21V 5/04* | (2006.01) |
| *F21V 14/00* | (2018.01) |
| *F21W 103/45* | (2018.01) |

(52) U.S. Cl.
CPC ............... *F21S 43/26* (2018.01); *F21S 43/14* (2018.01); *F21V 5/048* (2013.01); *F21V 14/006* (2013.01); *F21W 2103/45* (2018.01)

(58) Field of Classification Search
CPC .......... F21S 43/26; F21S 43/14; F21V 5/048; F21V 14/006
See application file for complete search history.

(56) References Cited

U.S. PATENT DOCUMENTS

| | | | | |
|---|---|---|---|---|
| 10,928,029 | B1 * | 2/2021 | Woo .................. | F21S 43/26 |
| 11,746,976 | B2 * | 9/2023 | Mudry .................. | F21S 43/26 |
| | | | | 362/520 |
| 11,746,982 | B1 * | 9/2023 | Lee .................. | F21S 41/43 |
| | | | | 362/520 |
| 11,754,245 | B1 * | 9/2023 | Lee .................. | F21S 41/25 |
| | | | | 362/511 |
| 11,780,365 | B2 * | 10/2023 | Kishigami ........... | F21S 43/30 |
| | | | | 315/77 |
| 2023/0332755 | A1 * | 10/2023 | Jin .................. | F21S 41/33 |

\* cited by examiner

*Primary Examiner* — Christopher E Dunay
(74) *Attorney, Agent, or Firm* — United One Law Group LLC; Kongsik Kim; Jhongwoo Peck

(57) ABSTRACT

A lamp for a vehicle forms a rear road surface pattern when the vehicle moves backward. The lamp for the vehicle includes a light source unit configured to generate light, a shield unit configured to selectively transmit a portion of the light generated from the light source unit, and a lens unit configured to concentrate the light transmitted through the shield unit onto a road surface. The lens unit includes a first lens part and a second lens part, and the second lens part includes an inner space through which the light emitted from the light source unit is transmitted.

28 Claims, 17 Drawing Sheets

LAMP FOR VEHICLE

CROSS-REFERENCE TO RELATED APPLICATION(S)

This application claims priority from Korean Patent Application No. 10-2022-0079353, filed on Jun. 29, 2022, which is incorporated herein by reference in its entirety.

TECHNICAL FIELD

The present disclosure relates to a lamp for a vehicle, and more particularly, to a lamp for a vehicle which forms a rear road surface pattern when the vehicle moves backward.

RELATED ART

In general, vehicles are equipped with various lamps, which have an illumination function for more easily identifying objects disposed around the vehicle during low-light conditions (e.g., nighttime driving) and a signaling function for informing other vehicles or road users of the driving states of the present vehicle.

For example, there are headlamps that emit light to the front to secure the driver's view, brake lights that are turned on when the driver depresses the brake pedal, direction indicator lights emitted when the vehicle is turning right or left, and reverse lights that are turned on when the vehicle is reversing. In addition, a reflector and the like are mounted on the front and rear of the vehicle to perform a function of reflecting light so that the vehicle is more easily recognized from the outside.

The reverse lights are turned on when the vehicle is reversing (or when the shift lever is put to the reverse position) to secure the driver's night vision, or notify other vehicles that the vehicle is reversing so that the other vehicles can prepare accordingly.

SUMMARY

The present disclosure provides a lamp for a vehicle that forms a rear road surface pattern when the vehicle moves backward.

The objects of the present disclosure are not limited to the aforementioned ones, but other objects not described herein will be clearly understood by those skilled in the art from descriptions below.

An aspect of the present disclosure provides a lamp for vehicle. The lamp for vehicle according to an embodiment of the present disclosure may include a light source unit configured to generate light, a shield unit configured to selectively transmit a portion of the light generated from the light source unit, and a lens unit configured to concentrate the light transmitted through the shield unit onto a road surface. The lens unit may include a first lens part and a second lens part, and the second lens part may include an inner space through which the light emitted from the light source unit is transmitted.

The following features may be included individually or in any combinations.

In an embodiment, the light source unit may include a light source that emits the light, and an optical part that allows the light to be emitted in one direction with linearity. The optical part may be disposed to be elongated in a vertical direction.

In an embodiment, the first lens part may include a convex lens, and the second lens part may include a concave lens.

In an embodiment, the light transmitted through the shield unit may pass through the convex lens after passing through the concave lens.

In an embodiment, a light diffusion layer that diffuses incident light may be disposed on an inner surface of the second lens part that defines the inner space.

In an embodiment, the light transmitted through the shield unit may include main transmission light that forms a plurality of road surface patterns in which the light is concentrated onto different regions, and the light transmitted through the shield unit may further include auxiliary transmission light that is emitted to allow the light to be concentrated onto one or more selected regions of the plurality of road surface patterns to increase brightness of the selected regions.

In an embodiment, the shield unit may include a main transmission aperture configured to form the main transmission light; and an auxiliary transmission aperture configured to form the auxiliary transmission light. The main transmission aperture and the auxiliary transmission aperture may be arranged linearly and may have same shape and size. In an embodiment, each of the main transmission aperture and the auxiliary transmission aperture may have a trapezoidal shape that is elongated in a vertical direction. In an embodiment, the light source unit may include a main light source part that corresponds to the main transmission aperture, and an auxiliary light source part that corresponds to the auxiliary transmission aperture. In an embodiment, each of the main light source part and the auxiliary light source part may have a vertical position and a size determined to allow the light to be concentrated to a predetermined region and with a predetermined size by the corresponding transmission aperture of the main transmission aperture and the auxiliary transmission aperture.

In an embodiment, the auxiliary transmission light may be emitted to a road surface pattern having lower brightness than other road surface patterns among the plurality of road surface patterns.

In an embodiment, an arrangement direction of the light source unit, the shield unit, and the lens unit may be inclined with respect to the road surface.

In an embodiment, at least a portion of the light source unit, at least a portion of the shield unit, and the first lens part may be coupled to the second lens part.

According to another aspect of the present disclosure, a lamp for a vehicle may include a light source unit configured to generate light, a shield unit configured to selectively transmit a portion of the light generated from the light source unit, and a lens unit configured to concentrate the light transmitted through the shield unit onto a road surface. The light source unit may include a main light source part, an auxiliary light source part, and a rear light source part, The following features may be included individually or in any combinations.

The lens unit may include a first lens part, a second lens part, and a rear lens part, and the second lens part may include an inner space through which the light emitted from the light source unit is transmitted.

Each of the main light source part, the auxiliary light source part, and the rear light source part may include a light source, and the light sources of the main light source part, the auxiliary light source part, and the rear light source part may be mounted on a same substrate.

The rear lens part may be coupled to the second lens part. In some embodiments, the rear lens part and the second lens part may be integrally formed. In some other embodiments, the rear lens part may be coupled to the second lens part by a screw or an adhesive.

A light emission surface of the rear lens part may be inclined with respect to an optical axis of the first lens part.

The rear lens part may include an emission path adjustment part to adjust an emission path of the light.

A development direction of a road surface pattern formed by the light emitted from the first lens part and a development direction of rear light formed by the light emitted from the rear lens part may different. The rear light may include first rear light and second rear light. The first rear light may be formed in a direction inclined to a left or right side with respect to a backward direction of the vehicle, and the second rear light may be formed in a direction parallel to the backward direction of the vehicle.

The light source unit may include a light source that emits the light, and an optical part that allows the light to be emitted in one direction with linearity. Each of the optical parts of the main light source part and the auxiliary light source part may be disposed to be elongated in a vertical direction.

The first lens part may include a convex lens, and the second lens part may include a concave lens.

A light diffusion layer that diffuses incident light may be disposed on an inner surface of the second lens part that defines the inner space.

The light transmitted through the shield unit may include main transmission light that forms a plurality of road surface patterns in which the light is concentrated onto different regions, and the light transmitted through the shield unit may further include auxiliary transmission light that is emitted to allow the light to be concentrated onto one or more selected regions of the plurality of road surface patterns to increase brightness of the selected regions.

The shield unit may include a main transmission aperture configured to form the main transmission light, and an auxiliary transmission aperture configured to form the auxiliary transmission light. The main transmission aperture and the auxiliary transmission aperture may be arranged linearly and have same shape and size. The main light source part may correspond to the main transmission aperture, and the auxiliary light source part may correspond to the auxiliary transmission aperture. Each of the main light source part and the auxiliary light source part may have a vertical position and a size determined to allow the light to be concentrated to a predetermined region and with a predetermined size by the corresponding transmission aperture of the main transmission aperture and the auxiliary transmission aperture.

Details regarding other embodiments of the present disclosure are included in the accompanying drawings and the detailed description.

BRIEF DESCRIPTION OF THE DRAWINGS

The accompanying drawings are included to provide a further understanding of the present disclosure, and are incorporated in and constitute a part of this specification. The drawings may illustrate exemplary embodiments of the present disclosure and, along with the description, serve to explain the principles of the present disclosure. In the drawings.

DETAILED DESCRIPTION

Figure 1:
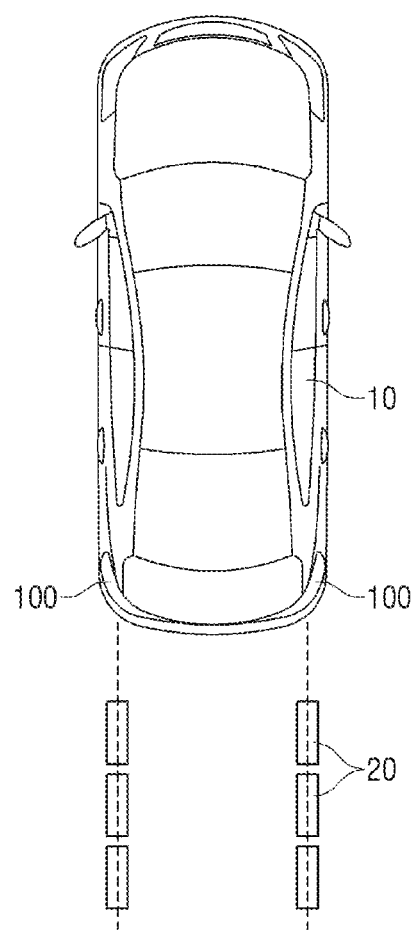
FIGS. 1 and 2 illustrate an example of a road surface pattern that is formed by a lamp for a vehicle according to an embodiment of the present disclosure.

Hereinafter, exemplary embodiments of the present disclosure will be described below in more detail with reference to the accompanying drawings. Advantages and features of the present disclosure, and implementation methods thereof will be clarified through the following embodiments described with reference to the accompanying drawings. The present disclosure may, however, be further embodied in different forms and should not be construed as being limited to the embodiments set forth herein. Rather, the embodiments set forth herein are provided so that the present disclosure will be thorough and complete, and will fully convey the scope of the present disclosure to those skilled in the art. The present disclosure is solely defined by the scopes of the claims. Like reference numerals refer to like elements throughout the present disclosure.

Unless any term used in the present disclosure is defined uniquely, all terms (including technical and scientific terms) used herein are given the definition generally understood by those skilled in the art. Also, unless explicitly defined in the description, the terms as defined in a commonly used dictionary are not to be construed too ideally or excessively as having formal meaning.

Figure 2:
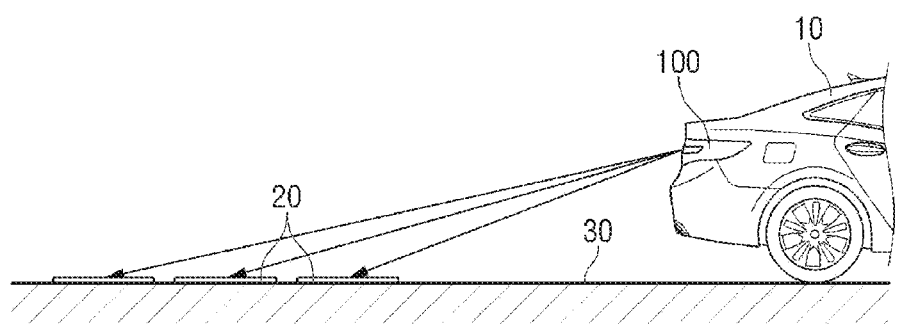

FIGS. 1 and 2 illustrate an example of a road surface pattern formed by a lamp for a vehicle according to an embodiment of the present disclosure. In reference to FIGS. 1 and 2, a lamp 100 for a vehicle (hereinafter, interchangeably termed as a vehicle lamp) according to the embodiment of the present disclosure may form a road surface pattern 20 on a road surface 30.

The vehicle lamp 100 may emit light to the road surface 30 to form the road surface pattern 20. The road surface pattern 20 may be formed by concentrating the light at specific areas on the road surface 30. In an embodiment of the present disclosure, the road surface pattern 20 may be formed on the road surface 30 behind the vehicle 10 when the vehicle 10 moves backward (or when the shift lever is put to the reverse position). Accordingly, the vehicle lamp 100 may be provided at the rear of the vehicle 10.

The vehicle 10 may include a plurality of vehicle lamps 100. For example, the vehicle lamps 100 may be disposed at the rear left and rear right of the vehicle 10, respectively. Different road surface patterns 20 may be formed by the vehicle lamps 100. In some embodiments, road surfaces patterns that are in the mirror-image may be formed by the vehicle lamps 100.

Each vehicle lamp 100 may form a plurality of road surface patterns 20. The plurality of road surface patterns 20 may be arranged linearly in a backward direction of the vehicle 10. According to some embodiments of the present disclosure, the plurality of road surface patterns may be arranged in a direction that is inclined to the left or to the right with respect to the backward direction of the vehicle 10.

In an embodiment of the present disclosure, the plurality of road surface patterns 20 may have the same or similar shapes and sizes. For example, as illustrated in FIG. 1, the plurality of road surface patterns 20 may include rectangular shapes having uniform horizontal and vertical lengths. According to some embodiments of the present disclosure, some or all of the plurality of road surface patterns 20 may respectively be different from one another or different from at least one other. Hereinafter, the road surface patterns 20 having the same shape and size will be mainly described as an example.

Although FIGS. 1 and 2 illustrate the vehicle lamp 100 forming three road surface patterns 20, the number of road surface patterns 20 formed by the vehicle lamp 100 may be variably determined. Hereinafter, an example in which the three road surface patterns 20 are formed by the vehicle lamp 100 will be mainly described.

Figure 3:
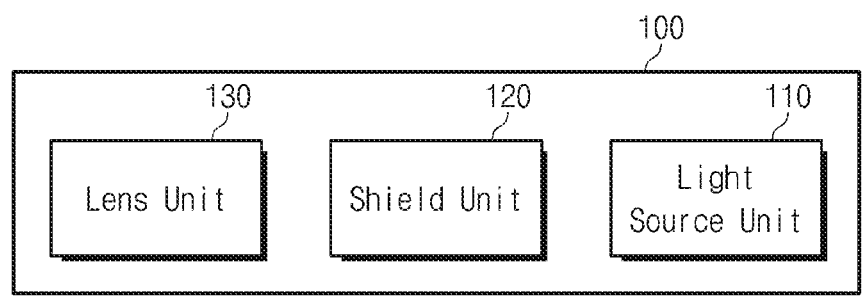
FIG. 3 depicts the lamp for the vehicle illustrated in FIGS. 1 and 2.
Figure 4:
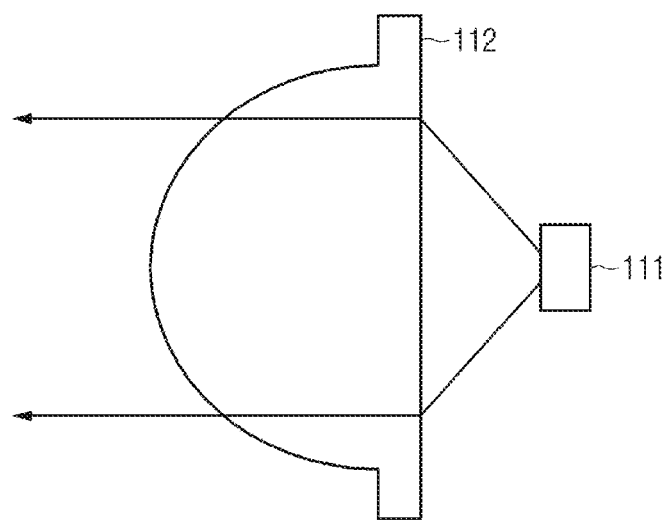
FIG. 4 illustrates an example of a light source unit depicted in FIG. 3.

FIG. 3 depicts the lamp for the vehicle illustrated in FIGS. 1 and 2, and FIG. 4 illustrates an example of a light source unit depicted in FIG. 3. In reference to FIG. 3, the vehicle lamp 100 according to an embodiment of the present disclosure may include a light source unit 110, a shield unit 120, and a lens unit 130.

The light source unit 110 may generate light. In reference to FIG. 4, the light source unit 110 may include a light source 111 and an optical part 112.

The light source 111 may emit light. In an embodiment of the present disclosure, the light source 111 may be implemented with a light emitting diode (LED). However, the light source 111 is not limited to the light emitting diode. The optical part 112 may be provided in the form of a collimator. For example, the optical part 112 may allow the light of the light source 111 to be emitted in one direction with linearity.

In other words, diverging light of the light source 111 may be converted to a substantially parallel light beam by the optical part 112.

In reference to FIG. 3, the shield unit 120 may selectively transmit a portion of the light from the light source unit 110. For example, the shield unit 120 may include a blocking area that blocks (e.g., obstructs) at least a portion of the light and a transmission area that transmits the light. A portion of the light from the light source unit 110 may be transmitted through the transmission area, and the remaining portion may be blocked by the blocking area. The light transmitted through the shield unit 120 may be transferred to the lens unit 130.

The lens unit 130 may concentrate the light transmitted through the shield unit 120 onto the road surface 30. The light concentrated onto the road surface 30 may form the road surface pattern 20.

The shield unit 120 may include a plurality of transmission areas. Some of the plurality of transmission areas may form main transmission light and others of the plurality of transmission areas may form auxiliary transmission light. From the light transmitted through the shield unit 120, the main transmission light may form a plurality of road surface patterns 20 in concurrence with the lens unit 130 to concentrate the light to different areas on the road surface 30. From the light transmitted through the shield unit 120, the auxiliary transmission light may be emitted to one or more selected areas among the plurality of road surface patterns 20, thereby increasing the brightness of the selected areas.

The portions of the plurality of road surface patterns 20 formed only by the main transmission light may be less bright than other remaining portions. The auxiliary transmission light may be emitted to the road surface pattern 20 having relatively low brightness among the plurality of road surface patterns 20. The plurality of road surface patterns 20 may be formed with more uniform brightness on the road surface 30 by emitting the auxiliary transmission light to the areas of the road surface pattern 20 having the relatively low brightness.

Figure 5:
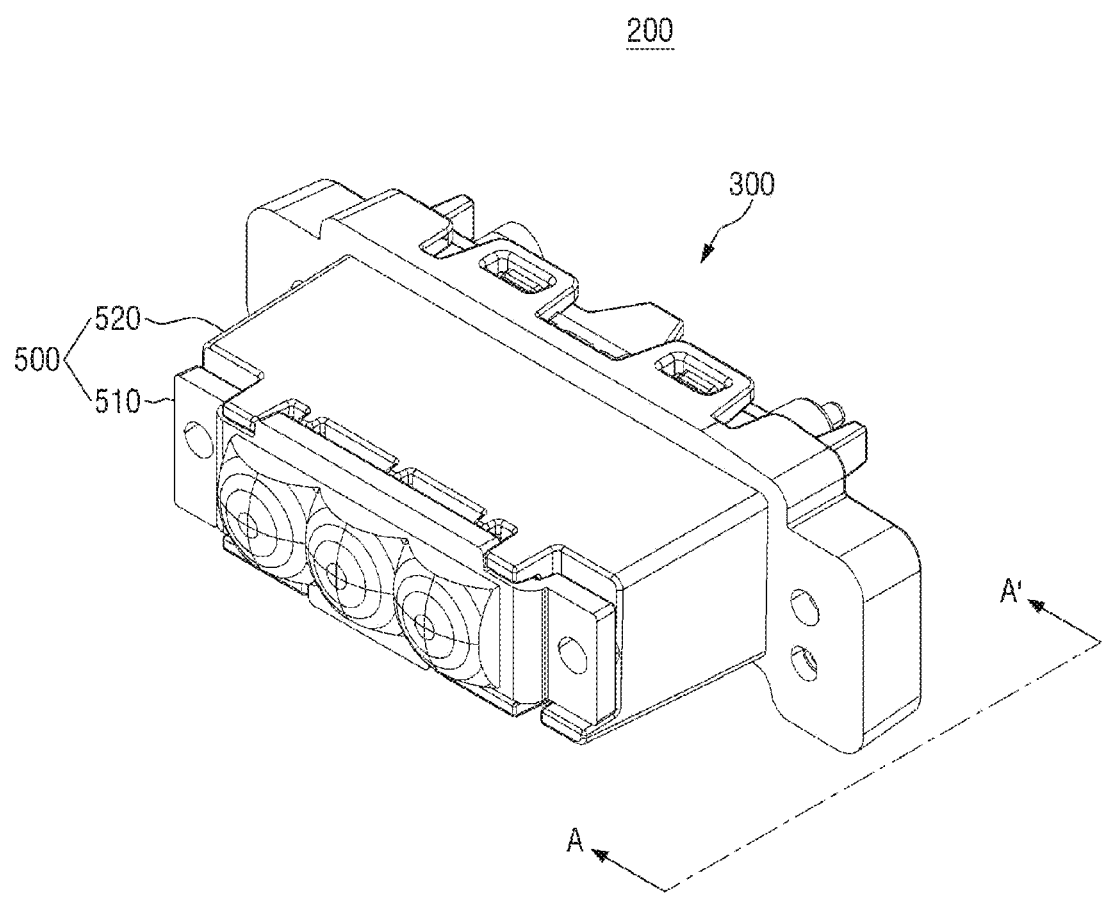
FIG. 5 illustrates an example of the lamp for the vehicle according to an embodiment of the present disclosure.
Figure 6:
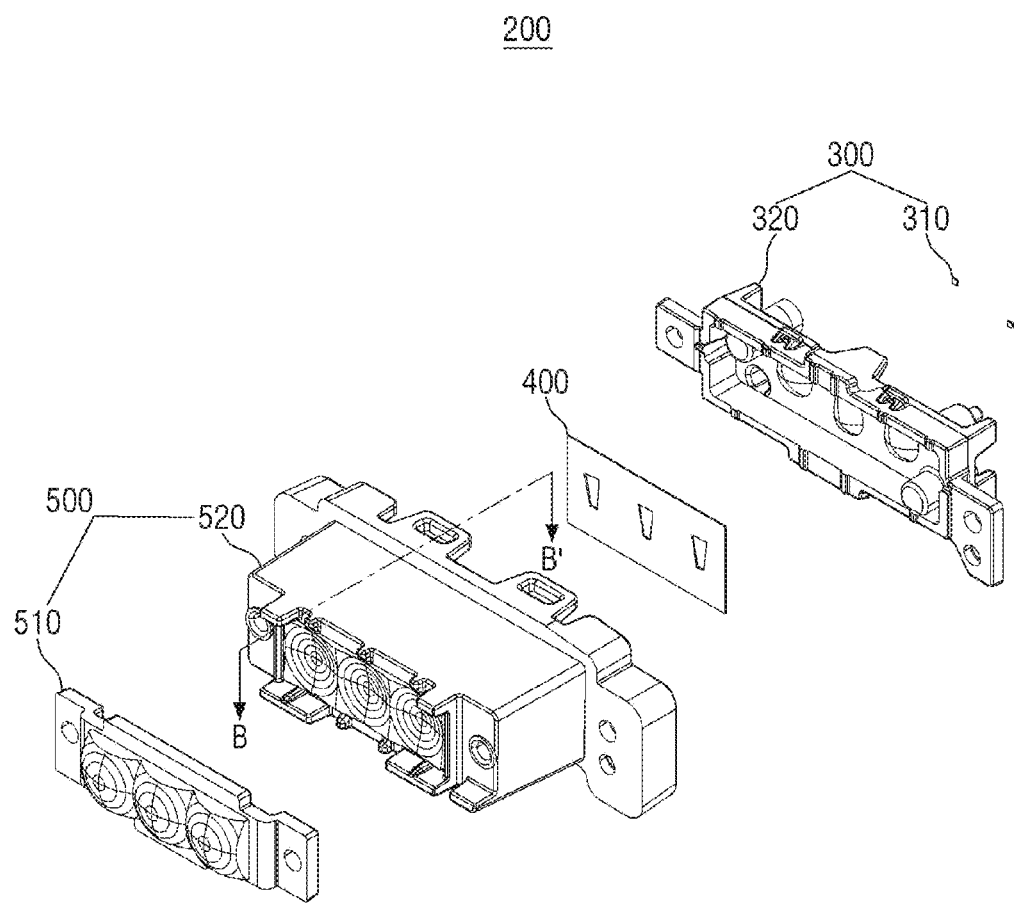
FIG. 6 is an exploded perspective view illustrating the lamp for the vehicle illustrated in FIG. 5.
Figure 7:
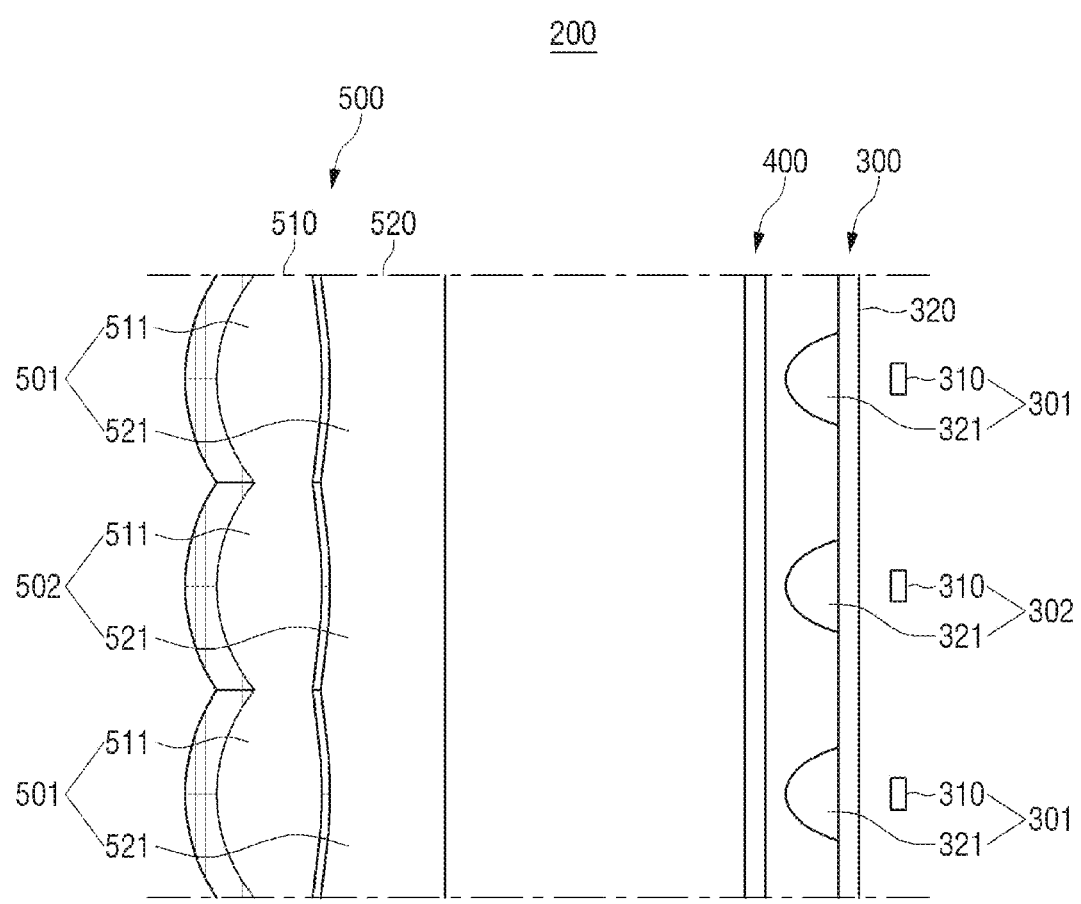
FIG. 7 is a cross-sectional view taken along line A-A' of FIG. 5.
Figure 8:
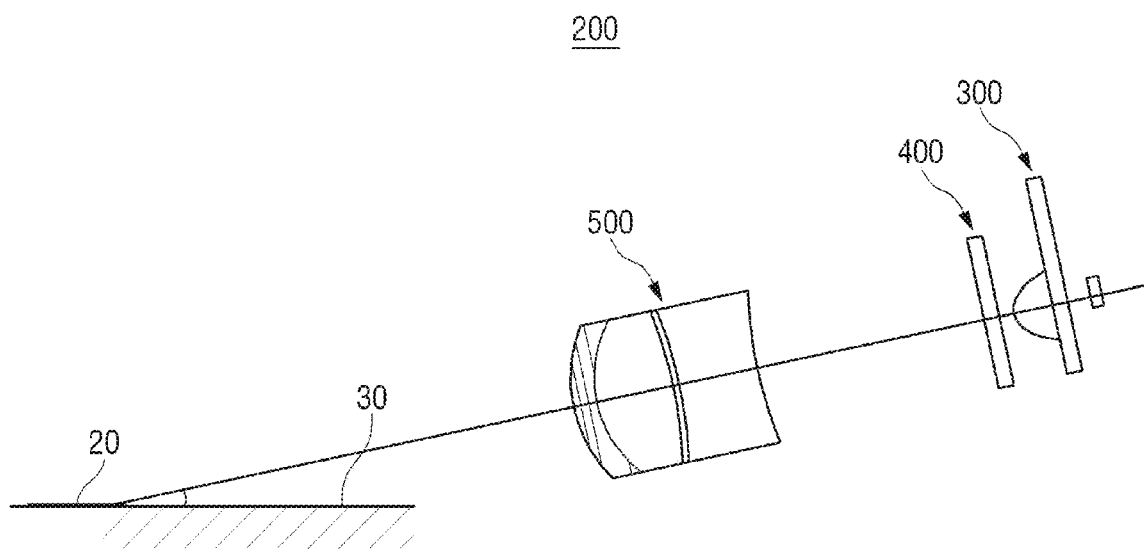
FIG. 8 depicts an arrangement of the lamp for the vehicle on the road surface according to an embodiment of the present disclosure.

FIG. 5 is a view illustrating an example of the lamp for the vehicle illustrated in FIG. 3, FIG. 6 is an exploded perspective view illustrating the lamp for the vehicle illustrated in FIG. 5, FIG. 7 is a cross-sectional view taken along line A-A' of FIG. 5, and FIG. 8 is a view illustrating an internal arrangement of the vehicle lamp 200 and its effect on the light transmitted onto the road surface 30 to help form the road surface pattern 20.

In reference to FIGS. 5 to 7, the vehicle lamp 200 may include a light source unit 300, a shield unit 400, and a lens unit 500. The light source unit 300, the shield unit 400, and the lens unit 500 may be disposed adjacent to one another. In other words, the shield unit 400 may be disposed in front of the light source unit 300, and the lens unit 500 may be disposed in front of the shield unit 400.

In reference to FIG. 8, an arrangement direction of the light source unit 300, the shield unit 400, and the lens unit 500 may be inclined with respect to the road surface 30. Thus, the light generated from the light source unit 300 may pass through the shield unit 400 and the lens unit 500 and then be emitted onto the road surface 30 to form the road surface pattern 20.

In reference again to FIGS. 5 to 7, the light source unit 300 may generate light. The light source unit 300 may include a light source 310 and an optical housing 320. The light source 310 may emit light. In an embodiment of the present disclosure, the light source 310 may be implemented with a light emitting diode (LED). However, the light source 310 is not limited to the light emitting diode, and may be implemented with various other types of light emitting devices.

The optical housing 320 may be coupled to a second lens part 520, which will be described later below. For example, the optical housing 320 and the second lens part 520 may be coupled by a coupling means such as a screw, a bolt, and the like. The shield unit 400 may be disposed in a space defined by the optical housing 320 and the second lens part 520. As the optical housing 320 and the second lens part 520 are coupled to each other, a distance between the shield unit 400 and the optical housing 320 and a distance between the shield unit 400 and the lens unit 500 may be maintained.

The optical housing 320 may include an optical part 321. The optical part 321 may allow the light of the light source 310 to be emitted in one direction with linearity. The light having the linearity may be transmitted to the shield unit 400.

The light source unit 300 may include a main light source part 301 and an auxiliary light source part 302. The main light source part 301 may generate the light used to form the plurality of road surface patterns 20. The auxiliary light source part 302 may generate the light to increase brightness of the selected road surface pattern 20 among the plurality of road surface patterns 20. A detailed description of the light source unit 300 will be provided later below with reference to FIG. 9.

The shield unit 400 may selectively transmit a portion of the light emitted from the light source unit 300. The shield unit 400 may include a plurality of transmission apertures 411, 412, and 420 (see FIG. 12) through which the light may be transmitted, and the light transmitted through the plurality of transmission apertures 411, 412, and 420 may be emitted to the road surface 30 to form the road surface pattern 20. A detailed description of the shape and function of the shield unit 400 will be provided later below with reference to FIGS. 12 to 16.

The lens unit 500 may concentrate the light transmitted through the shield unit 400 onto the road surface 30. The lens unit 500 may include a first lens part 510 and a second lens part 520. In reference to FIG. 7, the first lens part 510 may include a convex lens 511, and the second lens part 520 may include a concave lens 521. At least a portion of the light source unit 300, at least a portion of the shield unit 400, and the first lens part 510 may be coupled to the second lens part 520. The components constituting the vehicle lamp 200 may be coupled to the second lens part 520 to operate integrally. Thus, the vehicle lamp 200 may be more easily handled.

For example, the first lens part 510 and the second lens part 520 may be hook-coupled to each other. One of the first lens part 510 or the second lens part 520 may include a hook groove, and the other thereof may include a hook. As the first lens part 510 and the second lens part 520 are coupled to each other, the convex lens 511 and the concave lens 521 may be disposed to be axially aligned.

Each of the convex lens 511 and the concave lens 521 may be provided in plurality. The convex lens 511 and the concave lens 521 that overlap each other may provide a main lens part 501 or an auxiliary lens part 502. The main lens part 501 may transmit the light of the main light source part 301 to concentrate the light used for forming the plurality of road surface patterns 20 onto the road surface 30. The auxiliary lens part 502 may transmit the light of the auxiliary light source part 302 to concentrate the light onto the road surface 30, thereby increasing the brightness of the selected road surface pattern 20 among the plurality of road surface patterns 20.

The light transmitted through the shield unit 400 may pass through the concave lens 521 and then pass through the convex lens 511. The convex lens 511 may concentrate the incident light at a focal point. Thus, the shape of the road surface pattern 20 may be more clearly visible as the light transmitted through the convex lens 511 is concentrated onto the road surface 30. The convex lens 511 and the concave lens 521 may have different refractive indexes. As the convex lens 511 and the concave lens 521 having the different refractive indexes overlap each other, chromatic aberration of the light transmitted through the lens unit 500 may be reduced.

Figure 9:
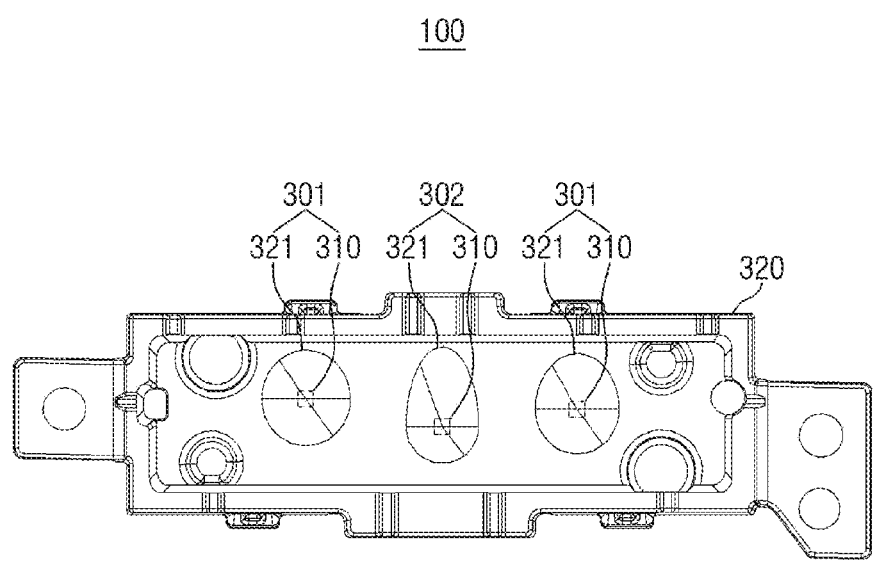
FIG. 9 is a front view of the light source unit according to an embodiment of the present disclosure.

FIG. 9 is a front view of the light source unit. In reference to FIG. 9, the light source unit 300 may include the main light source part 301 and the auxiliary light source part 302. The main light source part 301 may generate the light being emitted for forming the road surface pattern and the auxiliary light source part 302 may generate the light to increase the brightness of the selected road surface pattern 20 of the road surface patterns 20 formed by the main light source part 301.

The main light source part 301 may be disposed to correspond to main transmission apertures 411 and 412 (see FIG. 12) provided in the shield unit 400, and the auxiliary light source part 302 may be disposed to correspond to an auxiliary transmission aperture 420 (see FIG. 12) provided in the shield unit 400. The main light source part 301 may be disposed adjacent to the main transmission apertures 411 and 412 to emit the light to the main transmission apertures 411 and 412, and the auxiliary light source part 302 may be disposed adjacent to the auxiliary transmission aperture 420 to emit the light to the auxiliary transmission aperture 420.

The main light source part 301 and the auxiliary light source part 302 may each include a light source 310 and an optical part 321. The vertical position and size of each of the main light source part 301 and the auxiliary light source part 302 may be determined so that the light is concentrated to a specific area and with a specific size by the corresponding transmission aperture of the main transmission apertures 411 and 412 and the auxiliary transmission aperture 420.

As will be described later, the main transmission apertures 411 and 412 and the auxiliary transmission aperture 420, which are disposed in the shield unit 400, may each have a trapezoid shape that is elongated in the vertical direction. Accordingly, the optical parts 321 of the main light source part 301 and the auxiliary light source part 302 may each have a shape that is elongated in the vertical direction. The optical portion 321 having the shape that is elongated in the vertical direction may have a greater curvature in the horizontal direction than in the vertical direction. Thus, the optical part 321 may diffuse the light in the vertical direction and concentrate the light in the horizontal direction.

As will be described later, the main transmission apertures 411 and 412 and the auxiliary transmission aperture 420 formed in the shield unit 400 may have substantially the same shape and size. The light transmitted through the main transmission apertures 411 and 412 and the auxiliary transmission apertures 420 may form different road surface patterns 20. The main light source part 301 and the auxiliary light source part 302 may form the road surface patterns 20 having different shapes by the transmission apertures having the same shape and size. For example, one of the main light source parts 301 may be disposed at a higher position relative to the road surface than the other, and the auxiliary light source part 302 may be disposed at a lower position relative to the road surface than the main light source part 301.

Figure 10:
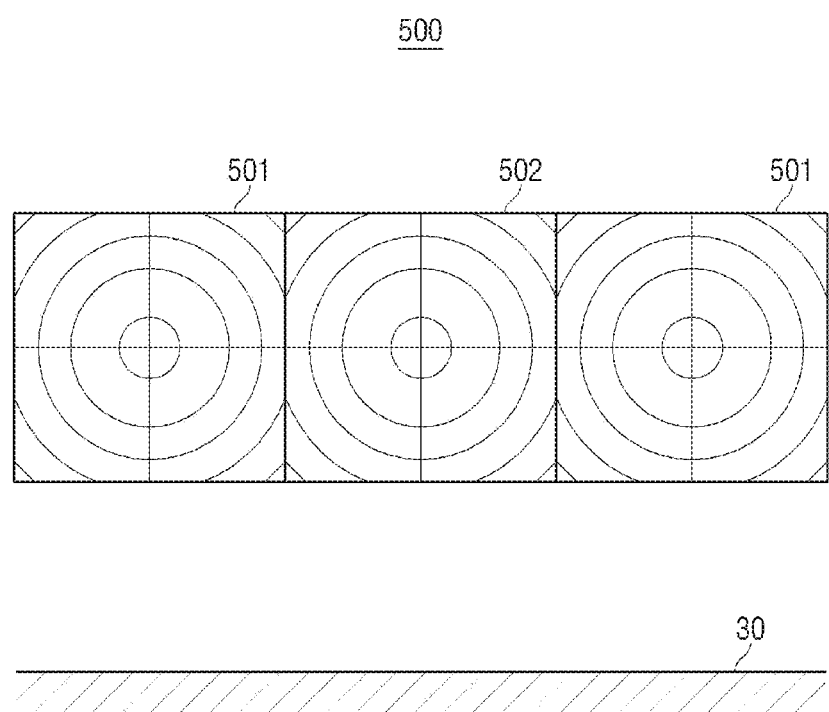
FIG. 10 is a front view of a lens unit according to an embodiment of the present disclosure.

FIG. 10 is a front view of a lens unit. In reference to FIG. 10, the lens unit 500 may include a main lens part 501 and an auxiliary lens part 502. The main lens part 501 and the auxiliary lens part 502 may be disposed side by side (e.g., laterally) at the same height with respect to the road surface 30. When the main lens part 501 and the auxiliary lens part 502 have substantially the same performance (in terms of the intensity and/or wavelength, for instance), the amount of light concentrated onto the road surface 30 by the main lens part 501 and by the auxiliary lens part 502 may be substantially equal.

Figure 11:
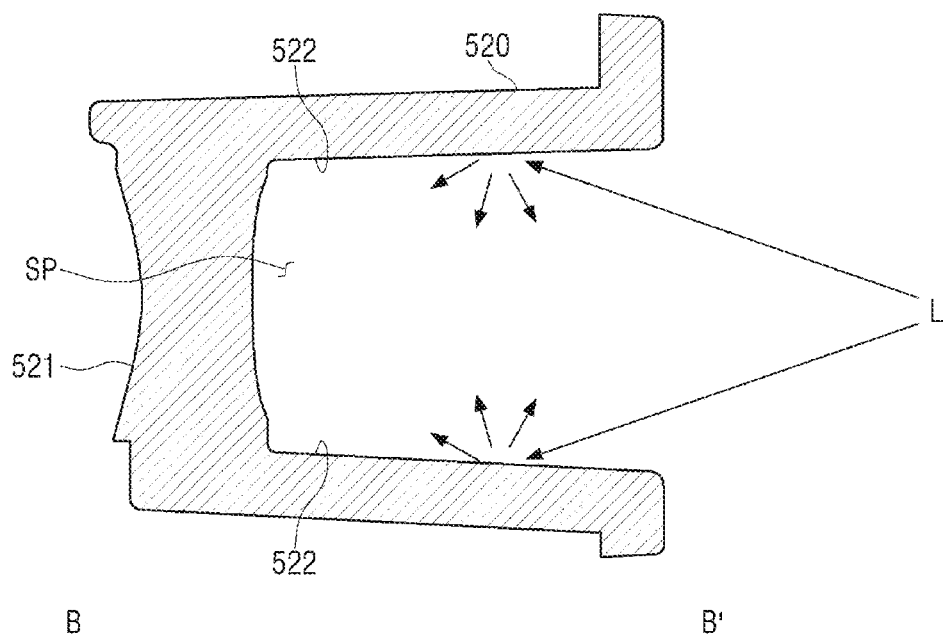
FIG. 11 is a cross-sectional view taken along line B-B' of FIG. 6.

FIG. 11 is a cross-sectional view taken along line B-B' of FIG. 6. In reference to FIG. 11, the second lens part 520 may include an inner space SP through which the light emitted from the light source unit 300 toward the first lens part 510 is transmitted. The light from the light source unit 300 may pass through the inner space SP of the second lens part 520 to reach the concave lens 521 and then pass through the first lens part 510, thereby forming the road surface pattern 20.

When a portion of the light that is incident to the inner space SP passes through a body of the second lens part 520 rather than the concave lens 521, the luminous intensity of the road surface pattern 20 may be reduced, or an unintended light pattern may be formed, which may deteriorate quality of the road surface pattern 20.

To prevent the light from being transmitted to other portions of the second lens part 520 other than the concave lens 521, a light diffusion layer 522 that diffuses the incident light L may be disposed on an inner surface of the second lens part 520 that defines the inner space SP. For example, the light diffusion layer 522 may be formed by etching the inner surface of the second lens part 520.

The light diffusion layer 522 may diffuse the incident light L without transmitting the incident light L. The light L may be prevented from being transmitted through the inner surface of the second lens part 520 by the light diffusion layer 522. In addition, a portion of the diffused light L may pass through the concave lens 521 and thus may be used to form the road pattern 20, thereby preventing the luminous intensity of the road pattern 20 from decreasing.

Figure 12:
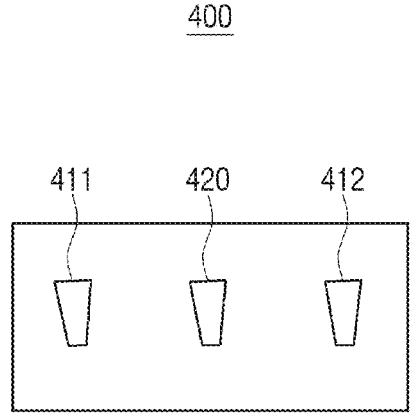
FIG. 12 is a front view of a shield unit according to an embodiment of the present disclosure.
Figure 13:
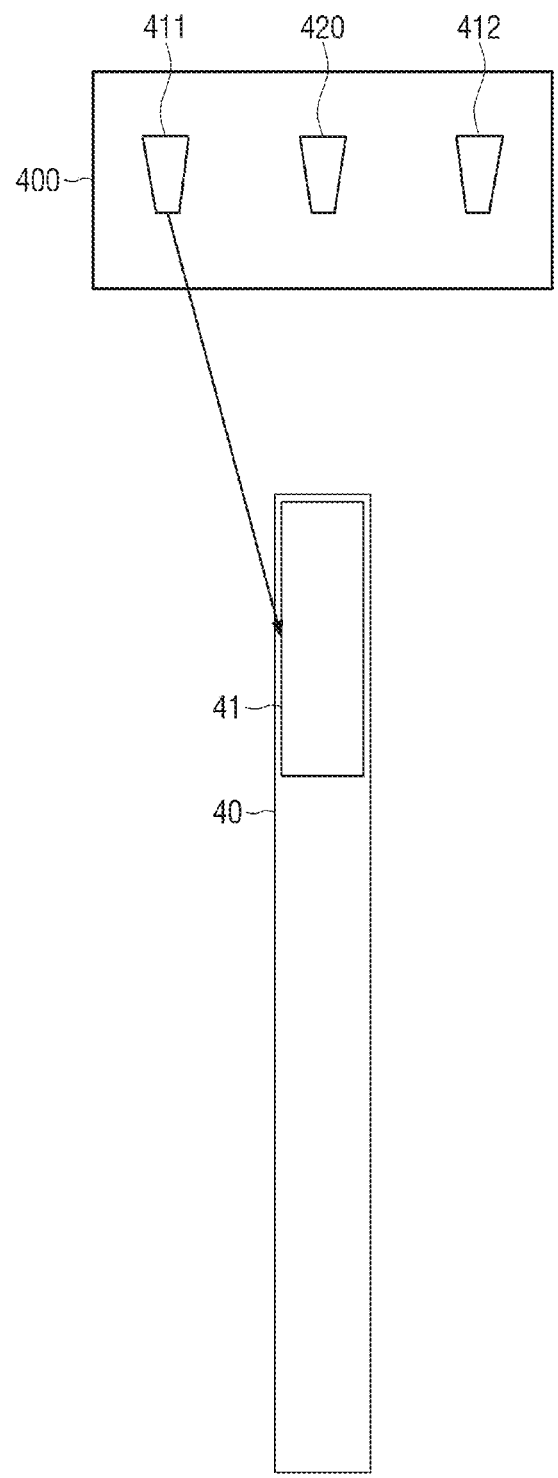
FIG. 13 illustrates an example of a road surface pattern that is formed by a first main transmission aperture according to an embodiment of the present disclosure.
Figure 14:
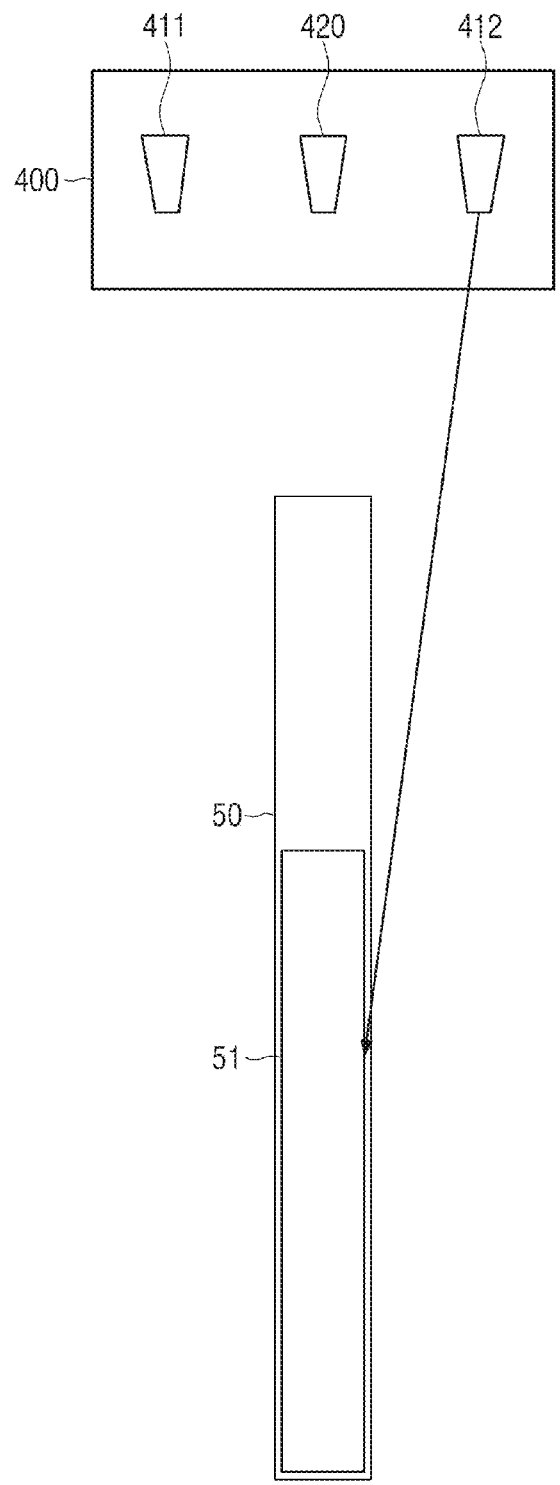
FIG. 14 illustrates an example of a road surface pattern that is formed by a second main transmission aperture according to an embodiment of the present disclosure.
Figure 15:
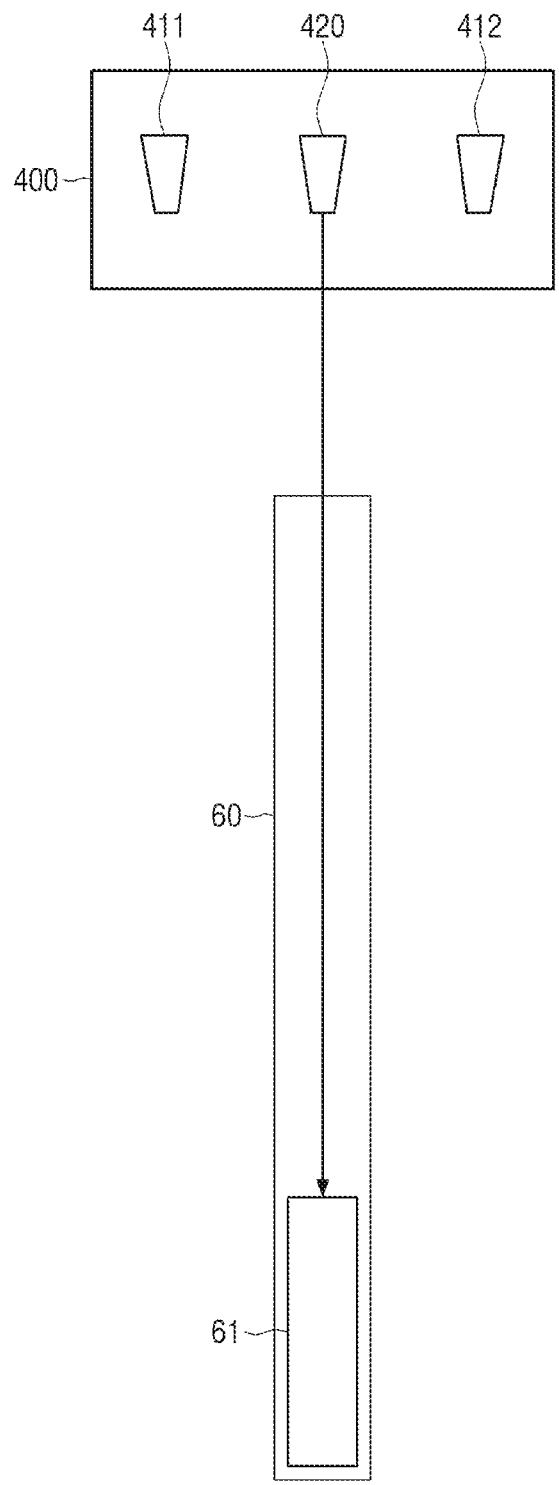
FIG. 15 illustrates an example of a road surface pattern that is formed by an auxiliary transmission aperture according to an embodiment of the present disclosure.
Figure 16:
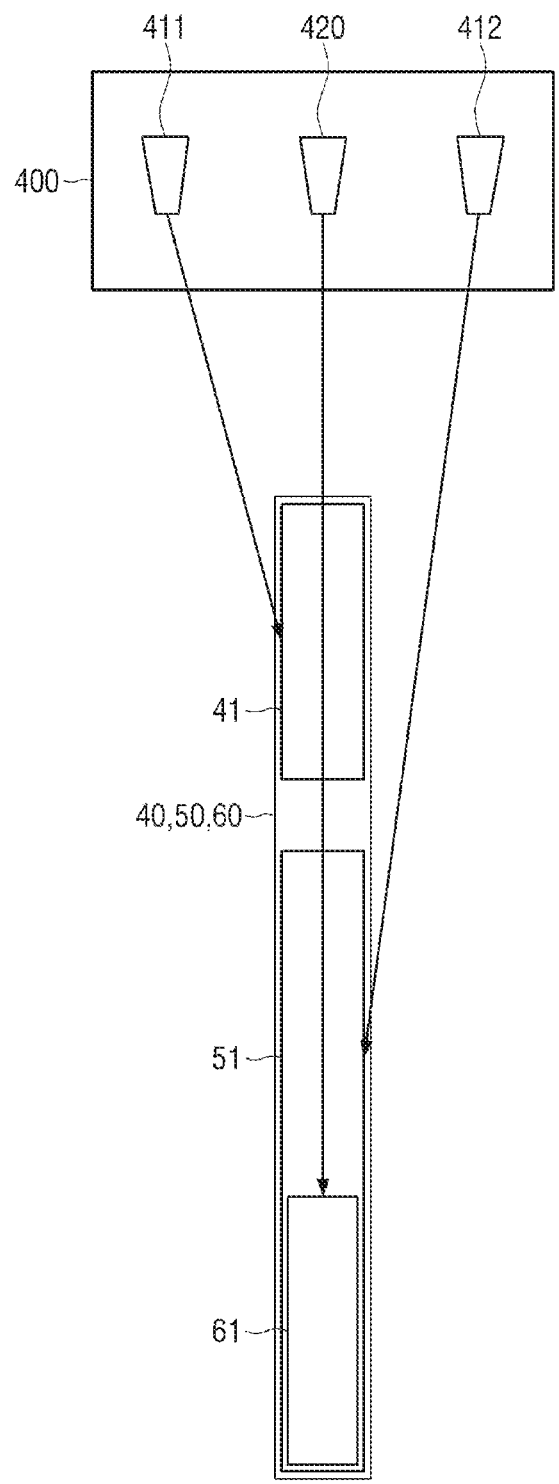
FIG. 16 illustrates an example of a road surface pattern that is formed by the main transmission aperture and the auxiliary transmission aperture according to an embodiment of the present disclosure.

FIG. 12 is a front view of the shield unit, FIG. 13 is a view illustrating an example of a road surface pattern formed by the first main transmission aperture 411, FIG. 14 is a view illustrating an example of a road surface pattern formed by the second main transmission aperture 412, FIG. 15 is a view illustrating an example of a road surface pattern formed by the auxiliary transmission aperture 420, and FIG. 16 is a view illustrating an example of a road surface pattern formed by the main transmission apertures 411 and 412 and the auxiliary transmission aperture 420.

In reference to FIG. 12, the shield unit 400 may include a plurality of transmission apertures 411, 412, and 420. The transmission apertures 411, 412, and 420 may include main transmission apertures 411 and 412 and an auxiliary transmission aperture 420. The main transmission apertures 411 and 412 may form main transmission light, and the auxiliary transmission aperture 420 may form auxiliary transmission light. The main transmission aperture 411 and 412 may be provided in plurality. In some other embodiments, the main transmission aperture may be provided in singularity. The main transmission apertures 411 and 412 and the auxiliary transmission apertures 420 may have the same shape and size, and may be arranged linearly. For example, the main transmission apertures 411 and 412 and the auxiliary transmission aperture 420 may be disposed at the same height (i.e., the vertical position) with respect to the road surface.

The main transmission apertures 411 and 412 and the auxiliary transmission aperture 420 may each have a trapezoidal shape that is elongated in the vertical direction. Thus, each light transmitted through the main transmission apertures 411 and 412 and the auxiliary transmission aperture 420 may form a rectangular road surface pattern 20 on the road surface 30. Although the structure in which the main transmission apertures 411 and 412 and the auxiliary transmission apertures 420 have the trapezoidal shape in the vertical direction, the shapes of the main transmission apertures 411 and 412 and the auxiliary transmission aperture 420 may be variously determined to correspond to the shape of the road surface pattern 20.

The shape and size of each of the main transmission apertures 411 and 412 and the auxiliary transmission aperture 420 may be the same, but the regions at which the light is concentrated, and then from which the concentrated light is transmitted, may be different from one another. For example, one of the main transmission apertures 411 and 412 may concentrate the light at an upper region to transmit the light, and the other may concentrate the light at a central region to transmit the light. In addition, the light may be concentrated at a lower portion of the auxiliary transmission aperture 420 and subsequently transmitted therethrough.

Although the shape and size of each of the transmission apertures 411, 412, and 420 may be the same, since the region onto which the light is transmitted and concentrated is different, the shape of the road surface pattern by the light transmitted through each of the transmission apertures 411, 412, and 420 and the region on which the light is concentrated may be formed differently.

In reference to FIGS. 13 to 16, the shield unit 400 may transmit light through the main transmission apertures 411 and 412 and the auxiliary transmission aperture 420 to form the road surface pattern. The main transmission apertures 411 and 412 may include a first main transmission aperture 411 and a second main transmission aperture 412. As illustrated in FIG. 13, the first main transmission aperture 411 may form a road surface pattern 40 in which light is concentrated near the vehicle lamp 200. The light transmitted through the first main transmission aperture 411 may form a road pattern 40 that is elongated in the traveling direction of the light to form a road surface pattern 40 in which the light is concentrated onto an area 41 of the entire area of the road surface pattern, which is more proximate to the vehicle lamp 200. An area, on which the light is concentrated, of the road surface pattern 40 by the first main transmission aperture 411 may be referred to as a first concentration area 41.

As illustrated in FIG. 14, the second main transmission aperture 412 may form a road surface pattern 50 in which the light is concentrated farther from the vehicle lamp 200. The light transmitted through the second main transmission aperture 412 may form a road pattern 50 that is elongated in the traveling direction of the light. In the road surface pattern 50, the light may be concentrated onto an area 51 of the entire area of the road surface pattern, which is more distant from the vehicle lamp 200. An area, on which the light is concentrated, of the road surface pattern 50 by the second main transmission aperture 412 may be referred to as a second concentration area 51.

As illustrated in FIG. 15, the auxiliary transmission aperture 420 may form a road surface pattern 60 in which the light is concentrated farther from the vehicle lamp 200. An area 61 on which the light is concentrated by the auxiliary transmission aperture 420 may belong to an area on which the light is concentrated by the second main transmission aperture 412, i.e., an area within the second concentration area 51, which is the farthest from the vehicle lamp 200. An area, on which the light is concentrated, of the road surface pattern 60 by the auxiliary transmission aperture 420 may be referred to as an auxiliary concentration area 61.

As illustrated in FIG. 16, the second concentration area 51 formed by the second main transmission aperture 412 may be longer than the first concentration area 41 formed by the first main transmission aperture 411. Particularly, the second concentration area 51 may be formed farther from the vehicle lamp 200 than the first concentration area 41. Therefore, since an insufficient amount of light may be emitted to the portion of the second concentration area 51, which is farthest from the vehicle lamp 200, the brightness may become lower than the brightness of other portions.

The auxiliary concentration area 61 formed by the auxiliary transmission aperture 420 may be formed on an area that has relatively low brightness within the second concentration area 51. Therefore, the first concentration area 41, the proximate area of the second concentration area 51, and the distant area of the second concentration area 51 of the entire road surface patterns 40, 50, and 60 may be observed with substantially uniform brightness.

Figure 17:
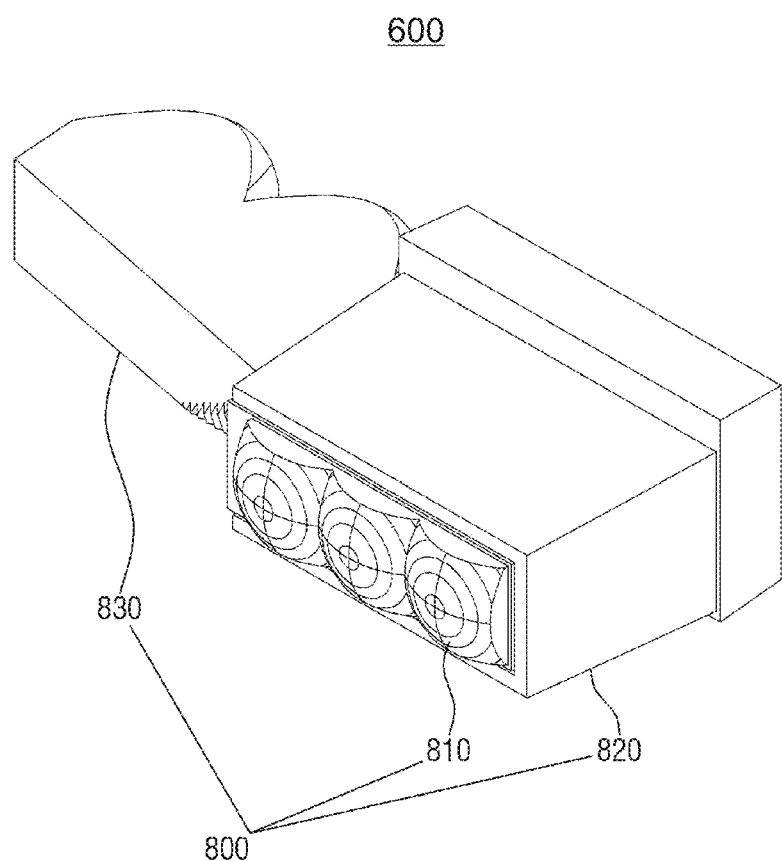
FIG. 17 illustrates a lamp for a vehicle according to another embodiment of the present disclosure.
Figure 18:
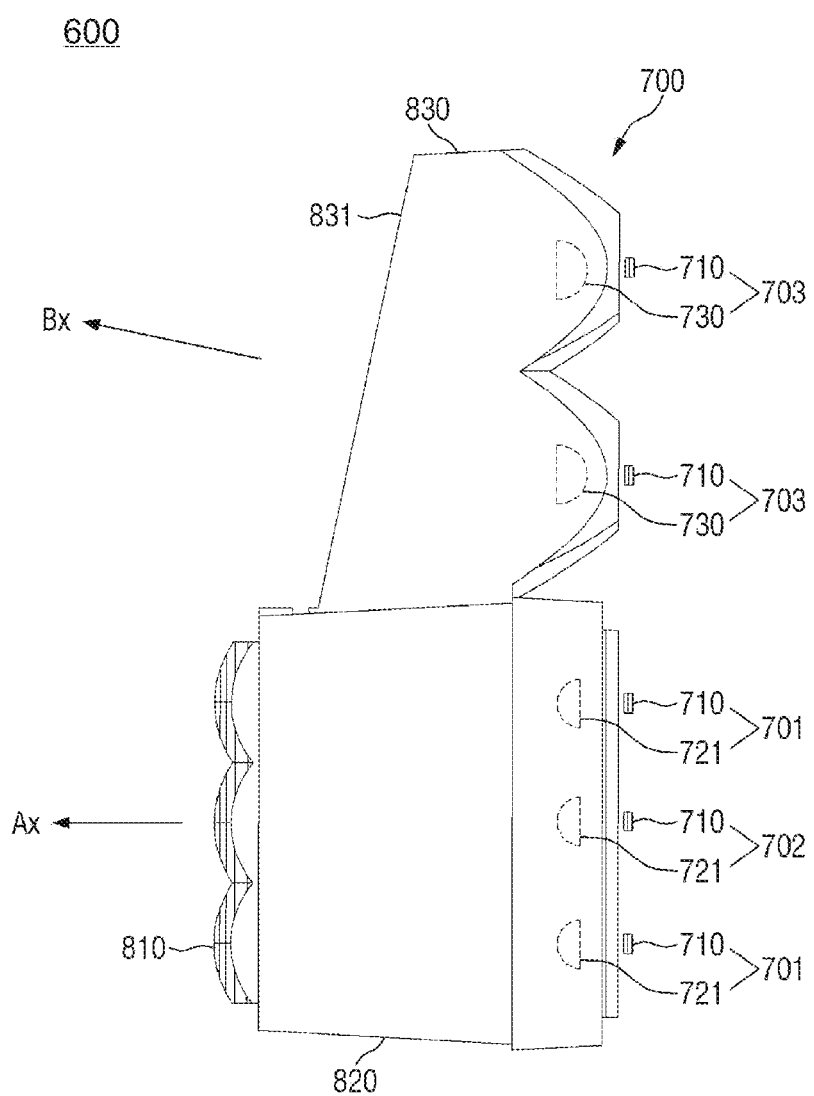
FIG. 18 is a plan view illustrating the lamp for the vehicle illustrated in FIG. 17.
Figure 19:
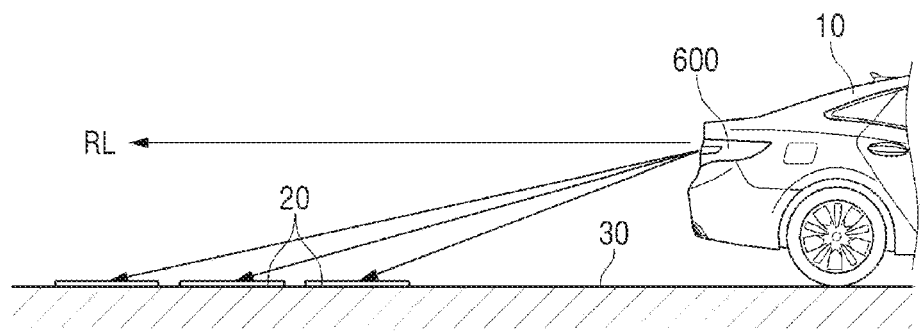
FIG. 19 illustrates an example of a road surface pattern and rear light that are formed by the lamp for the vehicle illustrated in FIG. 17.

FIG. 17 is a view illustrating a lamp for a vehicle according to another embodiment of the present disclosure, FIG. 18 is a plan view illustrating the lamp for the vehicle illustrated in FIG. 17, and FIG. 19 is a view illustrating an example of a road surface pattern and rear light formed by the lamp for the vehicle illustrated in FIG. 17.

In reference to FIGS. 17 to 18, a vehicle lamp 600 may include a light source unit 700, a shield unit, and a lens unit 800. The light source unit 700 may generate light. The light source unit 700 may include a light source 710 and optical parts 721 and 730. The light source 710 may emit light. In an embodiment of the present disclosure, the light source 710 may be implemented with a light emitting diode (LED). However, the light source 710 is not limited to the light emitting diode. The optical parts 721 and 730 may allow the light of the light source 710 to be emitted in one direction with linearity.

The light source unit 700 may include a main light source part 701, an auxiliary light source part 702, and a rear light source part 703. Functions of the main light source part 701 and the auxiliary light source part 702 may be the same as or similar to those of the main light source part 301 and the auxiliary light source part 302, which are described above. The rear light source part 703 may emit light for forming rear light. The rear light may be used to secure a rear view of the vehicle 10 when the vehicle 10 moves backward (or when the shift lever is put in the reverse position).

As illustrated in FIG. 19, the vehicle lamp 600 may form a road surface pattern 20 and rear light RL. The road surface pattern 20 and the rear lights RL may be formed concurrently.

In reference again to FIGS. 17 and 18, each of the main light source part 701, the auxiliary light source part 702, and the rear light source part 703 may include a light source 710. The light sources 710 of the main light source part 701, the auxiliary light source part 702, and the rear light source part 703 may be mounted on a common substrate. For this, the plurality of light sources 710 provided in the light source unit may be disposed on the same plane.

The shield unit may selectively transmit a portion of the light of the light source unit 700. Since the shape and function of the shield unit are the same as or similar to the shape and function of the shield unit 400 described above, a detailed description thereof will be omitted.

The lens unit 800 may concentrate the light transmitted through the shield unit onto the road surface 30. The lens unit 800 may include a first lens part 810, a second lens part 820, and a rear lens part 830. Since the shapes and functions of the first lens part 810 and the second lens part 820 are the same as or similar to those of the first lens part 510 and the second lens part 520, detailed descriptions are omitted.

The rear lens part 830 may transmit the light of the rear light source part 703 to form the rear light RL. The rear lens part 830 may include a light emission surface 831 having a predetermined size and may form the rear light RL that is emitted as a surface light through the light emission surface 831.

The rear lens part 830 may be coupled to the second lens part 820. For example, the rear lens part 830 may be coupled to the second lens part 820 using a coupling means such as a screw, a bolt, an adhesive, and the like. Alternatively, the rear lens part 830 and the second lens part 820 may be integrally formed to constitute the lens unit by using, for example, injection molding.

The light emission surface 831 of the rear lens part 830 may be disposed to be inclined with respect to an optical axis Ax of the first lens part 810. The optical axis Ax may be parallel with the major longitudinal axis of the vehicle. Accordingly, a development direction Ax of the road surface pattern formed by the light emitted from the first lens part 810 and a development direction Bx of the rear light formed by the light emitted from the rear lens part 830 may be different. In other words, the development direction Ax of the road surface pattern and the development direction Bx of the rear light may form an angle with respect to each other.

Figure 20:
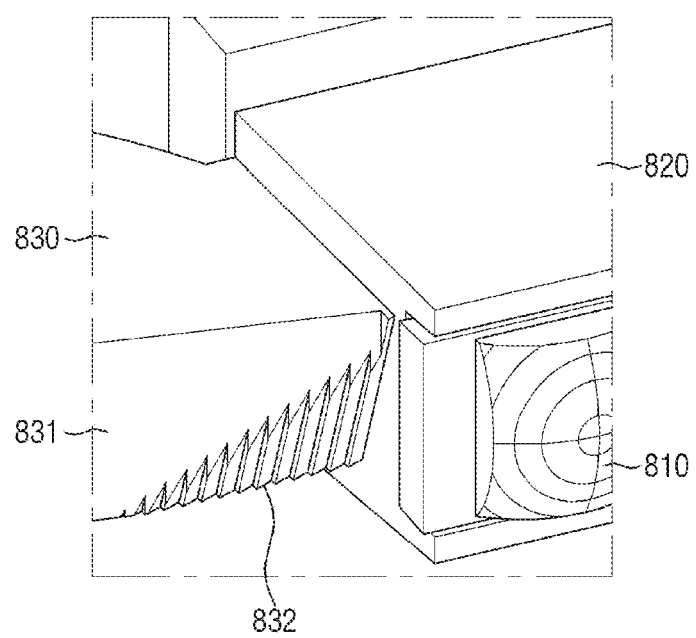
FIG. 20 illustrates a configuration in which an emission path adjustment part is provided in a rear lens part according to an embodiment of the present disclosure.
Figure 21:
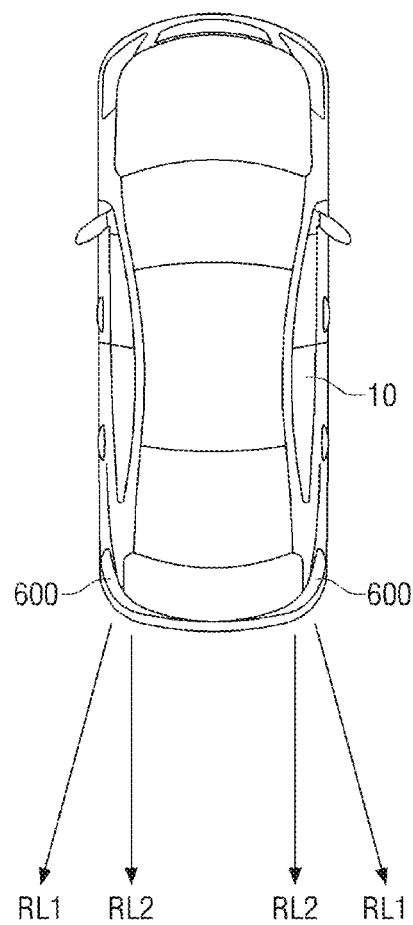
FIG. 21 illustrates an example of the rear light that is formed by the lamp for the vehicle according to an embodiment of the present disclosure.

FIG. 20 is a view illustrating a configuration in which an emission path adjustment part is provided in the rear lens part, and FIG. 21 is a view illustrating an example of the rear light formed by the lamp for the vehicle.

In reference to FIG. 20, the rear lens part 830 may include an emission path adjustment part 832 that adjusts an emission path of the light. The emission path adjustment part 832 may be disposed on the light emission surface 831. The emitted light, which is transmitted to the emission path adjustment part 832 from the rear light source part 703, may be refracted by the emission path adjustment part 832 and then further transmitted. The emission path adjustment part 832 may include at least one light refracting surface that refracts the incident light. When a plurality of light refracting surfaces are provided, the plurality of light refracting surfaces may be arranged in a stair-like shape.

In reference to FIG. 21, the vehicle lamp 600 may form the rear light RL. The rear light RL may include first rear light RL1 and second rear light RL2. The first rear light RL1 may be formed by the light emitted from the light emission surface 831 and may then be transmitted in a direction inclined to the left or right with respect to the backward direction of the vehicle 10. The second rear light RL2 may be formed by the light emitted from the emission path adjustment part 832 and may then be transmitted in a direction substantially parallel to the backward direction of the vehicle 10. As the first rear light RL1 and the second rear light RL2 are formed concurrently, a wider field of view of the rear of the vehicle 10 may be secured.

As described above, according to the lamp for the vehicle according to embodiments of the present disclosure, the rear road surface pattern may be formed when the vehicle moves backward. Thus, any drivers and/or pedestrians around the vehicle may recognize that the vehicle moves backward (or that the driver put the shift lever in the reverse position).

In addition, the lamp for the vehicle may be configured with lenses, without using a reflector. Hence, the lamp for the vehicle may proves a greater design flexibility.

Although any embodiment of the present disclosure is described with reference to the accompanying drawings, those with ordinary skill in the technical field pertaining to the present disclosure will understand that the present disclosure can be carried out in other forms without changing the technical idea or essential features disclosed herein. Therefore, any embodiment disclosed above is meant to be considered illustrative and not restrictive.

What is claimed is:

1. A lamp for a vehicle, comprising:
   a light source unit configured to generate light;
   a shield unit configured to selectively transmit a portion of the light generated from the light source unit; and
   a lens unit configured to concentrate the light transmitted through the shield unit onto a road surface,
   wherein the lens unit comprises a first lens part and a second lens part,
   wherein the second lens part comprises an inner space through which the light emitted from the light source unit is transmitted,
   wherein the light transmitted through the shield unit includes main transmission light that forms a plurality of road surface patterns in which the light is concentrated onto different regions, and
   wherein the light transmitted through the shield unit further includes auxiliary transmission light that is emitted to allow the light to be concentrated onto one or more selected regions of the plurality of road surface patterns to increase brightness of the selected regions.

2. The lamp of claim 1, wherein the light source unit comprises:
   a light source that emits the light; and
   an optical part that allows the light to be emitted in one direction with linearity,
   wherein the optical part is disposed to be elongated in a vertical direction.

3. The lamp of claim 1, wherein the first lens part comprises a convex lens, and the second lens part comprises a concave lens.

4. The lamp of claim 3, wherein the light transmitted through the shield unit passes through the convex lens after passing through the concave lens.

5. The lamp of claim 1, wherein a light diffusion layer that diffuses incident light is disposed on an inner surface of the second lens part that defines the inner space.

6. The lamp of claim 1, wherein the shield unit comprises:
   a main transmission aperture configured to form the main transmission light; and
   an auxiliary transmission aperture configured to form the auxiliary transmission light,
   wherein the main transmission aperture and the auxiliary transmission aperture are arranged linearly and have same shape and size.

7. The lamp of claim 6, wherein each of the main transmission aperture and the auxiliary transmission aperture has a trapezoidal shape that is elongated in a vertical direction.

8. The lamp of claim 6, wherein the light source unit comprises:
   a main light source part that corresponds to the main transmission aperture; and
   an auxiliary light source part that corresponds to the auxiliary transmission aperture.

9. The lamp of claim 8, wherein each of the main light source part and the auxiliary light source part has a vertical position and a size determined to allow the light to be concentrated to a predetermined region and with a predetermined size by the corresponding transmission aperture of the main transmission aperture and the auxiliary transmission aperture.

10. The lamp of claim 1, wherein the auxiliary transmission light is emitted to a road surface pattern having lower brightness than other road surface patterns among the plurality of road surface patterns.

11. The lamp of claim 1, wherein an arrangement direction of the light source unit, the shield unit, and the lens unit is inclined with respect to the road surface.

12. The lamp of claim 1, wherein at least a portion of the light source unit, at least a portion of the shield unit, and the first lens part are coupled to the second lens part.

13. A lamp for a vehicle, comprising:
    a light source unit configured to generate light;
    a shield unit configured to selectively transmit a portion of the light generated from the light source unit; and
    a lens unit configured to concentrate the light transmitted through the shield unit onto a road surface,
    wherein the light source unit comprises a main light source part, an auxiliary light source part, and a rear light source part,
    wherein the lens unit comprises a first lens part, a second lens part, and a rear lens part,
    wherein the first lens part is disposed in front of the second lens part, and the rear lens part is disposed laterally adjacent to the second lens part,
    wherein the second lens part comprises an inner space through which the light emitted from the light source unit is transmitted, and
    wherein an optical axis of a light emission surface of the rear lens part is inclined with respect to an optical axis of the first lens part.

14. The lamp of claim 13, wherein each of the main light source part, the auxiliary light source part, and the rear light source part comprises a light source, and
    wherein the light sources of the main light source part, the auxiliary light source part, and the rear light source part are mounted on a same substrate.

15. The lamp of claim 13, wherein the rear lens part is coupled to the second lens part.

16. The lamp of claim 15, wherein the rear lens part and the second lens part are integrally formed.

17. The lamp of claim 15, wherein the rear lens part is coupled to the second lens part by a screw or an adhesive.

18. The lamp of claim 13, wherein the rear lens part comprises an emission path adjustment part to adjust an emission path of the light.

19. The lamp of claim 13, wherein a development direction of a road surface pattern formed by the light emitted from the first lens part and a development direction of rear light formed by the light emitted from the rear lens part are different.

20. The lamp of claim 19, wherein the rear light comprises first rear light and second rear light,
    wherein the first rear light is formed in a direction inclined to a left or right side with respect to a backward direction of the vehicle, and
    wherein the second rear light is formed in a direction parallel to the backward direction of the vehicle.

21. The lamp of claim 13, wherein the light source unit comprises:
a light source that emits the light; and
an optical part that allows the light to be emitted in one direction with linearity.

22. The lamp of claim 21, wherein each of the optical parts of the main light source part and the auxiliary light source part is disposed to be elongated in a vertical direction.

23. The lamp of claim 13, wherein the first lens part comprises a convex lens, and the second lens part comprises a concave lens.

24. The lamp of claim 13, wherein a light diffusion layer that diffuses incident light is disposed on an inner surface of the second lens part that defines the inner space.

25. A lamp for a vehicle, comprising:
a light source unit configured to generate light;
a shield unit configured to selectively transmit a portion of the light generated from the light source unit; and
a lens unit configured to concentrate the light transmitted through the shield unit onto a road surface,
wherein the light source unit comprises a main light source part, an auxiliary light source part, and a rear light source part,
wherein the lens unit comprises a first lens part, a second lens part, and a rear lens part,
wherein the second lens part comprises an inner space through which the light emitted from the light source unit is transmitted,
wherein the light transmitted through the shield unit includes main transmission light that forms a plurality of road surface patterns in which the light is concentrated onto different regions, and
wherein the light transmitted through the shield unit further includes auxiliary transmission light that is emitted to allow the light to be concentrated onto one or more selected regions of the plurality of road surface patterns to increase brightness of the selected regions.

26. The lamp of claim 25, wherein the shield unit comprises:
a main transmission aperture configured to form the main transmission light; and
an auxiliary transmission aperture configured to form the auxiliary transmission light,
wherein the main transmission aperture and the auxiliary transmission aperture are arranged linearly and have same shape and size.

27. The lamp of claim 26, wherein the main light source part corresponds to the main transmission aperture, and
wherein the auxiliary light source part corresponds to the auxiliary transmission aperture.

28. The lamp of claim 26, wherein each of the main light source part and the auxiliary light source part has a vertical position and a size determined to allow the light to be concentrated to a predetermined region and with a predetermined size by the corresponding transmission aperture of the main transmission aperture and the auxiliary transmission aperture.

* * * * *